United States Patent
Brejcha et al.

[15] 3,696,669
[45] Oct. 10, 1972

[54] TEST PLUG FOR FILTER ASSEMBLY

[72] Inventors: Robert J. Brejcha, Westchester; William H. Corbett, Lincolnshire, both of Ill.

[73] Assignee: Everpure, Inc., Oak Brook, Ill.

[22] Filed: March 18, 1971

[21] Appl. No.: 125,756

[52] U.S. Cl. .................................................73/168
[51] Int. Cl. ..........................................G01m 19/00
[58] Field of Search .......222/381; 137/544; 141/126, 141/127, 285, 286; 73/498, 168, 138, 251, 220

[56] References Cited
UNITED STATES PATENTS

| 3,292,428 | 12/1966 | Motl | 73/168 X |
| 2,730,897 | 1/1956 | Morse | 73/168 X |

Primary Examiner—Reuben Friedman
Assistant Examiner—Frederick F. Calvetti
Attorney—Frank R. Thienpont

[57] ABSTRACT

A fluid pressure line test plug for use in connection with a filter assembly mounting head which is fixedly mounted in a fluid line and wherein the head has inlet and outlet ports the test plug being formed with fluid passage means permitting direct communication between the inlet and outlet ports of the head member disposed in the fluid pressure line.

8 Claims, 7 Drawing Figures

Inventors:
Robert J. Brejcha
William H. Corbett
By Frank R. Thuenport
Atty.

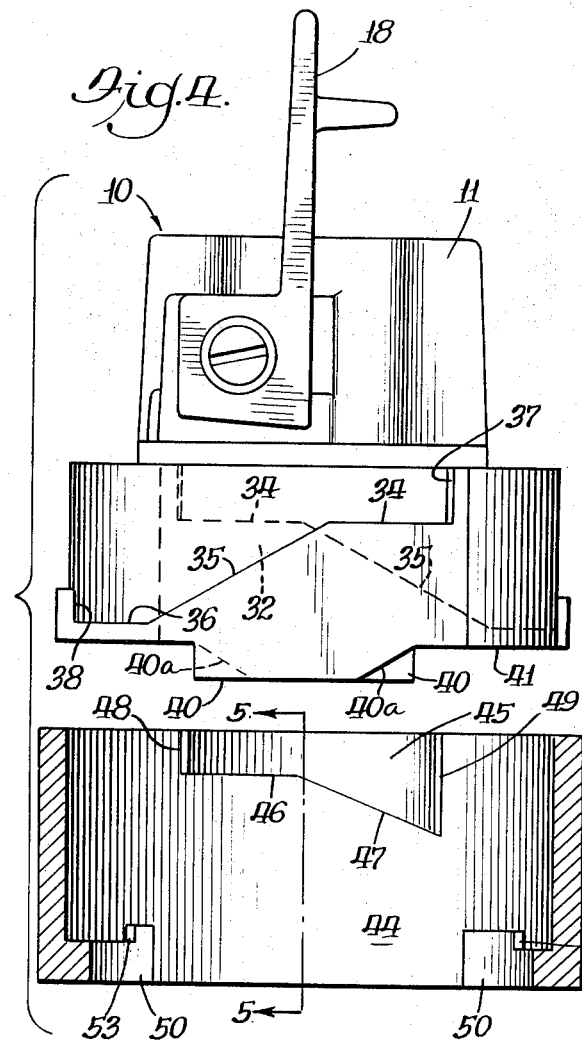
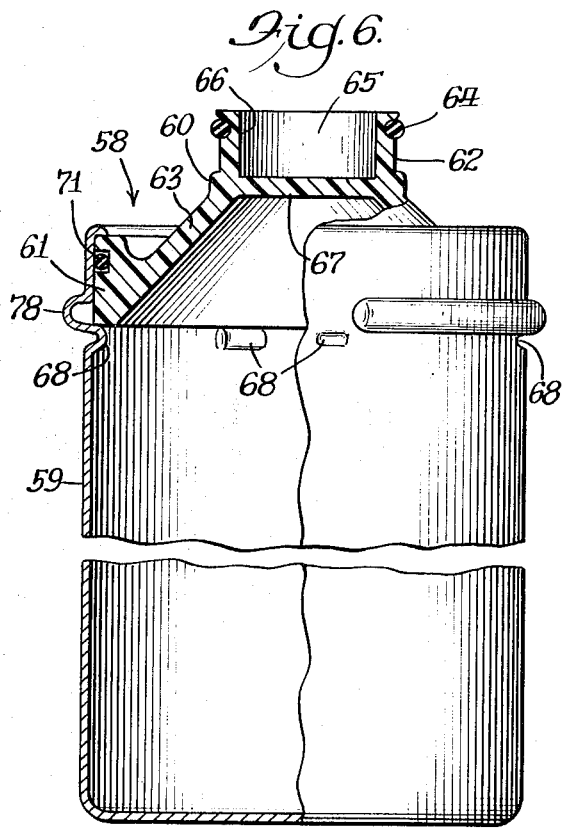
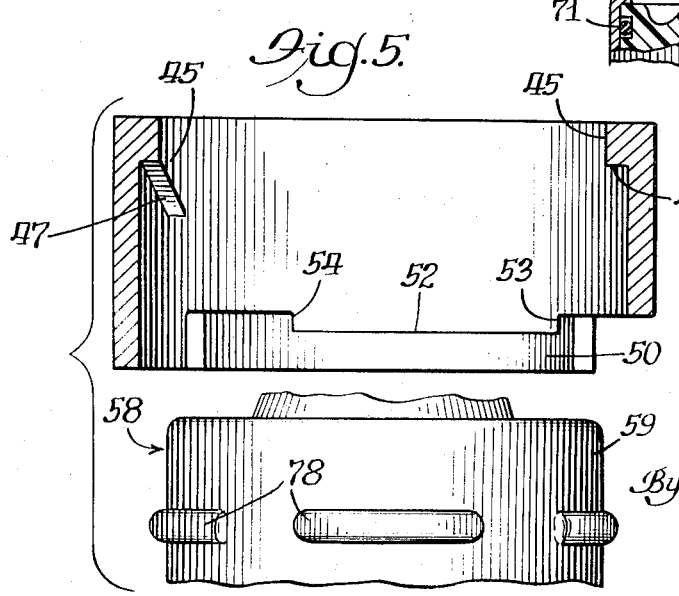
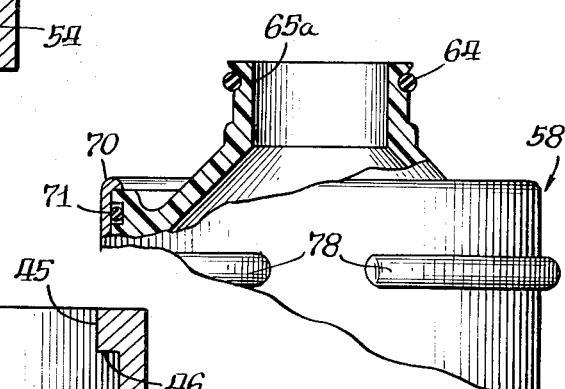

TEST PLUG FOR FILTER ASSEMBLY

This invention relates to a test plug member to be used in connection with testing a filter assembly mounting head connected in a fluid pressure line.

A primary object of the present invention is to provide a test plug for a head member in a fluid pressure line, the head member being adapted to receive therein a filter unit.

A further object is to provide a test plug for the head member to determine whether the shut-off valve associated with said head member is operating properly.

Another object of this invention is to provide a test plug which is used for determining whether the head member is properly constructed to make a proper seal with a filter unit which is adapted to be brought into sealing engagement with the head member.

A further object is to provide a test plug for the head member in a fluid pressure line system to provide fluid communication through the head member to be able to test the fluid line system beyond the head member.

Briefly summarized the invention herein includes a test plug unit for use in connection with a head member mounted in a fluid pressure line to conduct tests on a fluid pressure system and the head member inserted therein. The head member with which the test plug is used is of the type described in the co-pending application of Jack W. Thomsen for U.S. Pat. Ser. No. 831,030 filed on June 6, 1969, and assigned to the same assignee as this application. The test plug member is constructed with a boss member which is insertable into the head member in sealing relation therewith. The test plug is provided with through passage means which is effective to establish fluid communication between the inlet and outlet ports of the head member. The test plug member is adapted to be secured in a sealing relationship with the head member by means of a clamping collar in a manner as described in the above referred to co-pending U.S. patent application.

DESCRIPTION OF THE DRAWINGS

FIG. 4 is an exploded elevation view of the head member and clamping collar;

FIG. 5 is a sectional view taken along the line 5—5 of FIG. 4 and including a fragmentary elevational view of the upper portion of the test plug;

FIG. 6 is an elevational view partially in section of the test plug;

FIG. 7 is a partial sectional view in elevation of a modified form of the test plug.

DETAILED DESCRIPTION

Figure 1:
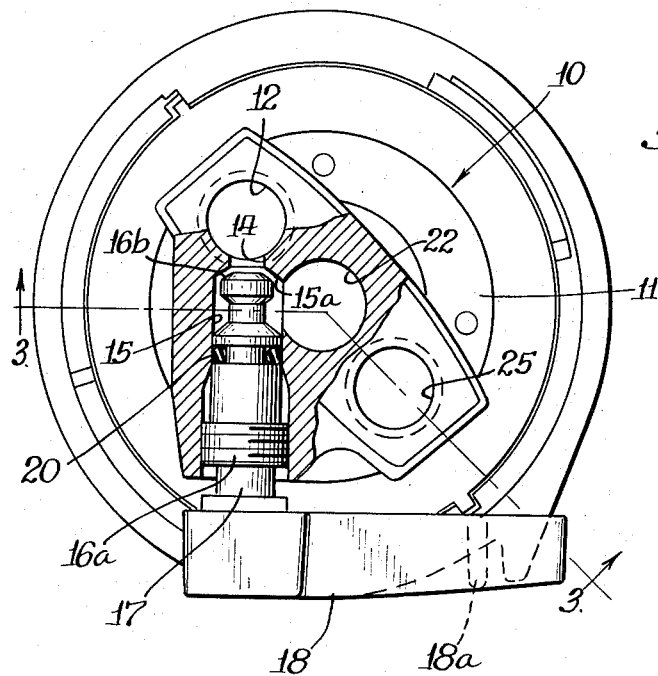
FIG. 1 is a top plan view of a head member of a filter assembly with which the test plug of the present invention is adapted to be associated.
Figure 2:
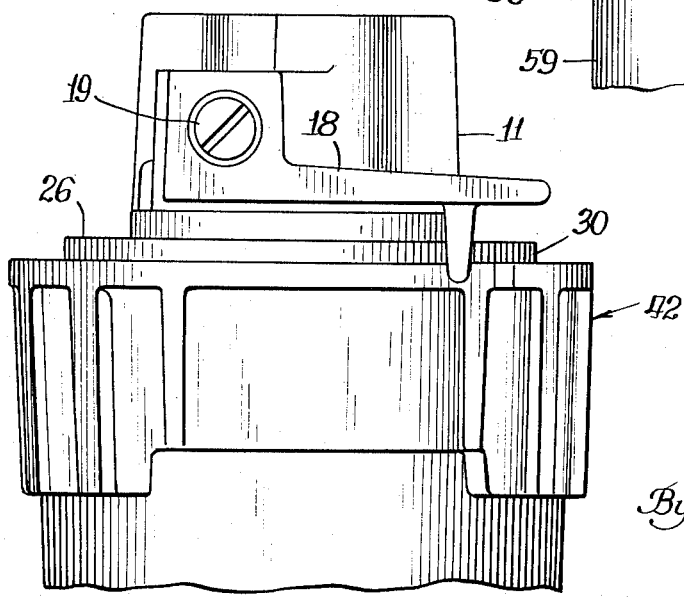
FIG. 2 is a fragmentary side elevational view of the head member and test plug.

The test plug is used with a head member, generally designated 10, which is preferably made of a metal construction. The head member 10 includes a first part 11 having an internally threaded inlet port 12 which communicates with a cross-bore 14, the latter being in coaxial communication with an enlarged bore 15. A valve stem 16 has a threaded portion 16a in threaded engagement with internal threads in the bore 15. The valve stem includes an extension 17 connected to one end of a manual actuating lever 18, this connection being effected by a fastener 19. The valve stem 16 is in sealing engagement with the bore 15 by means of an "O" ring 20. The valve has a frusto-conical portion 16b for sealing engagement with a valve seat 15a. When the actuating lever 18 is in its horizontal or open portion as illustrated in FIGS. 1 and 2, the portion 16b is unseated permitting communication between the inlet port 12 and a centrally disposed inlet port defined by bore 22 which intersects the bore 15. The lead of the thread 16a is such that when the lever 18 is moved to the vertical or shut-off position illustrated in FIG. 4, the valve portion 16b is seated against the surface 15a.

The bore 22 opens into a central recess or bore 24 which defines a downwardly facing shoulder 24a. Bore 24 is coaxially disposed with respect to bore 22. The part 11 includes an outlet port 25 which is internally threaded at the upper end thereof and which has its lower end opening at the shoulder 24a, thereby being in communication with the bore 24. It will be understood that the inlet port 12 and outlet port 25 are adapted for threaded engagement with suitable fittings for connecting such ports with inlet and outlet conduits or tubes respectively forming part of associated apparatus. The head member 10 may be fixedly mounted by suitable bracket means (not shown).

The head as here shown also includes a second part 26 having a central bore 27 communicating with frusto-conical bore 28. The part 26 includes an integral, and generally cylindrical skirt portion 30. This skirt portion includes integral, identical formations 32 formed on the outside of the skirt 30 and which are diametrically oppositely disposed in the relation illustrated in FIG. 4. The part 26 may be formed integrally with the first part 11 or seperately and then attached to part 11 by suitable fastening means such as screws.

Each formation 32 has an arcuate, generally horizontally disposed cam surface 34, a helical or inclined cam surface 35 and another arcuate, generally horizontally disposed czm surface 36. The cam surface 34 joins with a vertically extending cam stop surface 37. In like manner the cam surface 36 joins with a vertically extending cam stop surface 38. The lower edge of the skirt 30 includes a pair of identical, and diametrically oppositely disposed formations 40 depending from the lower edge of the skirt and each defining an inclined cam surface 40a. These formations seperate a pair of generally diametrically oppositely disposed arcuate lower edge surfaces 41, the latter being disposed in a common horizontal plane.

A locking ring or clamping collar, generally designated 42, includes a sleeve like member 44 having internal, diametrically oppositely disposed formations 45 which are identical and which are arranged for cooperating with respective formations 32. Each formation 45 is formed at the upper edge of the collar 42 and includes a generally horizontally disposed downwardly facing cam surface 46 joining with an inclined or helical cam surface 47. The formation 45 also includes end surfaces or stops 48 and 49 which are generally vertically extending.

Arranged intermediate the formations 45 but at the opposite lower edge of collar 42 are a pair of internal ledge formations 50, the latter being identical and arranged such that they are disposed 180° from each other. Each ledge 50 has an arcuate generally horizontally disposed recess surface 52 opposite ends of the latter joining with stop surfaces 53 and 54.

The clamping collar 42 is rotatably mounted on the part 26 of the head member cam with the cam surfaces on the formations 32 in respective engagement with the cam surfaces on the formations 45. When the collar 42 is in the clamping position illustrated in FIG. 2, the cam surfaces 34 and 35 are coextensively engaged with respective cam surfaces 46 and 47, and with stop surfaces 37 and 48 in abutting engagement. Rotation of the collar 42 in a clockwise direction (FIG. 1) causes seperation of the cam surfaces 35 and 47 and the stop surfaces 37 and 48. This rotation also causes sliding engagement between the cam surfaces 34 and 46 until the end of the cam surfaces 46 engage the cam surfaces 35 whereupon the collar 42 will commence moving axially or downwardly to its unclamped position. The limitation of rotation of the ring 42 in a clockwise direction to its fully unclamped position is determined by the stops 49 on the collar 42 engaging the cam stops 38 on the part 26.

One embodiment of the test plug that can be used in conjunction with head member 10 is shown in FIG. 6 and is designated generally by the numeral 58. It may comprise a metal can type structure in the form of a generally cylindrical vessel 59 to which is attached at the upper and thereof a cap member 60 which may be of metal or plastic construction.

The cap member 60 is of a generally conical shape. As here shown it may be formed with a rim portion 61 at the base end and a smaller annular boss portion 62 which is disposed coaxially with the rim portion 61 the two being interconnected by a web portion 63. The upper end of the vessel 59 may be crimped into place on the rim 61 of the cap member 60. An "O" ring sealing member 64 is disposed on the outer surface of the boss 62. A cylindrical recess 65 is formed in the boss 62 the recess being defined by the inner wall 66 and the web portion 67.

Suitable means is provided to prevent the cap member 60 from sliding down into the vessel 59. One manner in which this may be done is by forming a plurality of circumferentially spaced dimples 68 in the upper end of the vessel to form a support for the cap member. Another method is to bond the outer periphery of the rim portion 61 to the inner surface of the vessel 59. Another method is to provide one or more column supports within the vessel and extending between the bottom of the vessel and the lower end of the cap member.

Figure 3:
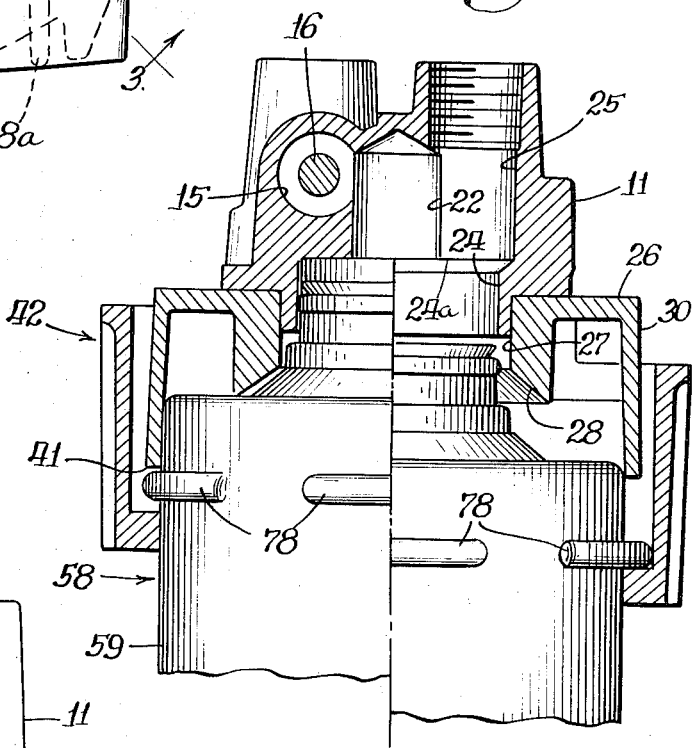
FIG. 3 is a view partially in section taken along the line 3—3 of FIG. 1 showing a clamping collar and a test plug in the clamped position in the left hand portion of the Figure and in the unclamped position in the right hand portion of the Figure.

When the test plug 58 is inserted into position in the head member 10 as best shown in the left hand portion of FIG. 3 the "O" ring 64 is in sealing engagement with the bore 24 and the recess 65 is in fluid communication with both the inlet and outlet ports 12 and 25 respectively. Thus when the valve 18 is opened fluid may flow from the inlet port 12, into bore 22 and into the recess 65 and directly to the outlet 25.

An alternate form of construction of the test plug designated 158 is shown in FIG. 7. In this construction there is no web portion 67 formed in the cap member 60 as shown on FIG. 6. The inner wall 65a defines a straight through cylindrical bore. Thus when the test plug 158 is inserted in place in the bore 24 of the head member incoming fluid may fill the entire vessel 59 and is not confined to a recess 64.

It will be observed that in this construction the pressure fluid being within the vessel will have a tendency to push the cap member 60 out of the vessel 59. This construction thus utilizes the rolled over lip 70 to advantage to resist the outward movement of the cap member. In this particular construction an "O" ring 71 around the rim 61 provides an effective seal against leakage of pressure fluid.

The vessel 59 may be constructed in substantially the same manner as the pressure vessel shown in the copending U.S. application referred to above. In both constructions the vessel 59 includes a pair of diametrically oppositely disposed, integral ridge surfaces or formations as 78. These formations extend outwardly and are adapted to be received in respective recesses 52 formed in the ledges 50 for supporting the test plug unit 58 in the collar 42.

The test plug may be advantageously used in performing a variety of tests on the head member 10 without having to use one or more actual filter units.

I claim:
1. The combination comprising:
   a head member for insertion into a fluid carrying line said head member being adapted to have a filter assembly operatively associated therewith;
   inlet and outlet ports formed in said head member; means defining centrally disposed bore means in said head member;
   means defining first communicating passage means between said inlet and outlet ports; a plug member for insertion into said centrally disposed bore means;
   means defining second passage means associated with said plug member, said second passage means when said plug member is inserted into said bore establishing fluid communication between said inlet and outlet ports of said head member.

2. The combination of claim 1 wherein
   said plug member includes an open ended vessel, and a cap member secured in the open end of said vessel, and further includes
   means associated with said vessel and said cap member for securely positioning said cap member in said vessel against the force of pressure fluid.

3. The combination of claim 1 wherein
   said second passage means comprises recess means in the upper end of said plug member.

4. The combination of claim 1 wherein
   said plug member includes a vessel, a cap member mounted in the end of said vessel, central bore means in said cap member providing a passage into said vessel, said central bore in said cap member being in fluid communication with said inlet and outlet ports in said head member.

5. The combination of claim 1 including a shut-off valve for shutting off line pressure to the inlet port in said head member.

6. The combination of claim 1 including sealing means disposed between said plug member and said bore.

7. The combination of claim 6 wherein said sealing means comprises "O" ring means mounted on said plug member.

8. The combination of claim 1 wherein said second passage means defines an unrestricted path for fluid communication between the inlet and outlet ports in said head member.

* * * * *